United States Patent [19]

Benz

[11] Patent Number: 5,394,723

[45] Date of Patent: Mar. 7, 1995

[54] STAND FRAME FOR A ROLLER LEVELLING MACHINE

[75] Inventor: Willi Benz, Neuss, Germany

[73] Assignee: SMS Schloemann-Siemag Aktiengesellschaft, Dusseldorf, Germany

[21] Appl. No.: 157,766

[22] Filed: Nov. 24, 1993

[30] Foreign Application Priority Data

Nov. 26, 1992 [DE] Germany .................. 42 39 641.7

[51] Int. Cl.⁶ .............................................. B21B 13/00
[52] U.S. Cl. ........................................ 72/163; 72/160;
72/455; 100/214
[58] Field of Search .............. 72/160, 163, 237, 455,
72/164, 165; 100/214

[56] References Cited

U.S. PATENT DOCUMENTS

| 3,457,754 | 7/1969 | Hagemann | 72/160 |
| 3,479,856 | 11/1969 | Boggio | 72/455 |
| 3,895,512 | 7/1975 | Sack | 72/455 |
| 4,615,208 | 10/1986 | Hailey | 100/214 |
| 4,696,180 | 9/1987 | Zandel | 72/455 |

FOREIGN PATENT DOCUMENTS 15020 1/1985 Japan .................. 72/164

Primary Examiner—Daniel C. Crane
Attorney, Agent, or Firm—Anderson Kill Olick & Oshinsky

[57] ABSTRACT

A stand frame for a roller levelling machine and including spaced frame posts formed each of two spaced post members, and frame cross-piece members including cross-piece elements which connect each of the two post members forming a frame post, with each cross-piece element being connected to respective post members with hollow dowel.

7 Claims, 3 Drawing Sheets

STAND FRAME FOR A ROLLER LEVELLING MACHINE

BACKGROUND OF THE INVENTION

The present invention relates to a rolling mill stand frame which includes stand frame posts connected by frame cross-piece elements including cross-beams. In particular, the present invention relates to a stand frame of a roller levelling machine for producing sheets, strips and profiles and including top and bottom rolls displaceable relative to each other and which are supported along their length by back-up rolls, which are supported on the cross-beams and are arranged in roll bearers, with the upper cross-beam being adjustable for positioning the levelling rolls.

Multi-part stand frames, which includes housing posts and upper and lower frame cross-piece elements extending between the stand frame posts, for roller levelling machines, as well as for other type of rolling mills and presses are well known. A known stand frame includes two opposite stand frame posts connected by upper and lower cross-beams. In known roller levelling machines, the cross-beams are adjustable up and down with four adjusting cylinders to adjust the gap between the levelling rolls to different thicknesses of levelled stocks, on one side, and, on the other side, to adjust the relative position of the top and bottom levelling rolls in a direction transverse to the movement direction of the levelled stock. The rolling stands are also equipped with adjusting devices which permit adjustment of stand rolls in accordance with the thickness of the rolled sheet or strip.

It is known to provide, for connection of the stand frame posts with the frame cross-piece elements, grooves in which connecting feather keys are arranged. In order to enable taking up forces generated in levellers, presses and rolling mills, providing of several feather key connections is necessary. This is because if a single groove for a feather key is used, it should be formed, in the stand frame post, very deep, and this results in an excessive weakening of the rolling mill housing. Therefore, several feather key connections need be formed and this, however, because of presence of multi-surface arrangements, makes the uniform load distribution very difficult. That is the generated forces cannot be proportionally distributed between separate feather key connections. Also, providing several feather key grooves and feather keys or wedges arranged therein results in a very adverse notch effect.

Accordingly, the object of the invention is providing a stand frame, in particular, for a roller levelling machine for sheets and strips, which would insure a uniform load distribution by using particular connection joints which can be produced with low manufacturing costs.

SUMMARY OF THE INVENTION

This and other objects of the invention, which would become apparent hereinafter, are achieved by connecting the stand frame posts and the frame cross-piece elements with hollow dowels. Dowel connections according to the present invention, has many advantages in comparison with feather key connections. In particular, with dowel connections, a substantially lower notch effect is obtained, and by preferably simultaneous forming of the boreholes for dowels in the stand frame posts and the cross-piece elements, manufacturing costs are substantially reduced. The simultaneous forming of the boreholes in the stand frame posts and cross-piece elements permits to achieve a precise spacing between the dowels, which is another advantage of the connection according to the present invention.

Because the hollow dowels, that is hollow bolts are used as connection elements, they, under the action of a load, change their cross-section to an oval, which permits to achieve a deformation that insures a uniform bearing capability of separate dowels. When, advantageously, each dowel connection between the stand frame post and the cross-piece element consists of at least two spaced dowels arranged one above the other and having inner bores of different diameters, the uniform distribution of the load for all connection positions can be optimized so that carrying capacity of all dowels is the same. Likewise, a equal load distribution for each dowel can be achieved by an appropriate selection of the diameters of the inner bores of the dowels if this is necessitated by the available profile.

In accordance with an advantageous embodiment of the present invention, each dowel connection is formed of three dowels arranged one above the other, with the diameter of the inner bore of the dowel, which is located in the region of the greatest beam force, being the biggest and the diameter of the inner bore of the dowel, which is located in the region of the smallest beam force, being the smallest. Such selection of inner bore diameters permits to achieve a desirable force distribution on separate dowels.

According to the invention, it is envisaged providing lateral screw connections between the stand frame posts and the cross-piece elements. These screw or transverse connections provide for taking up of expansion forces between the stand frame posts and the cross-piece elements. Hydraulic fastening devices can be used for screwing the stand frame posts with the cross-piece elements. Because dowel connections provide uniform distribution of forces and, thus, the same bearing capacity of all dowels, the screws can be made of the same size, so that the same screw thrust force is available.

BRIEF DESCRIPTION OF THE DRAWINGS

The objects and features of the present invention will become more apparent, and the invention itself will be best understood from the following detailed description of the preferred embodiment, when read with reference to the appended drawings, wherein.

DETAILED DESCRIPTION OF THE PREFERRED EMBODIMENT

Figure 1:
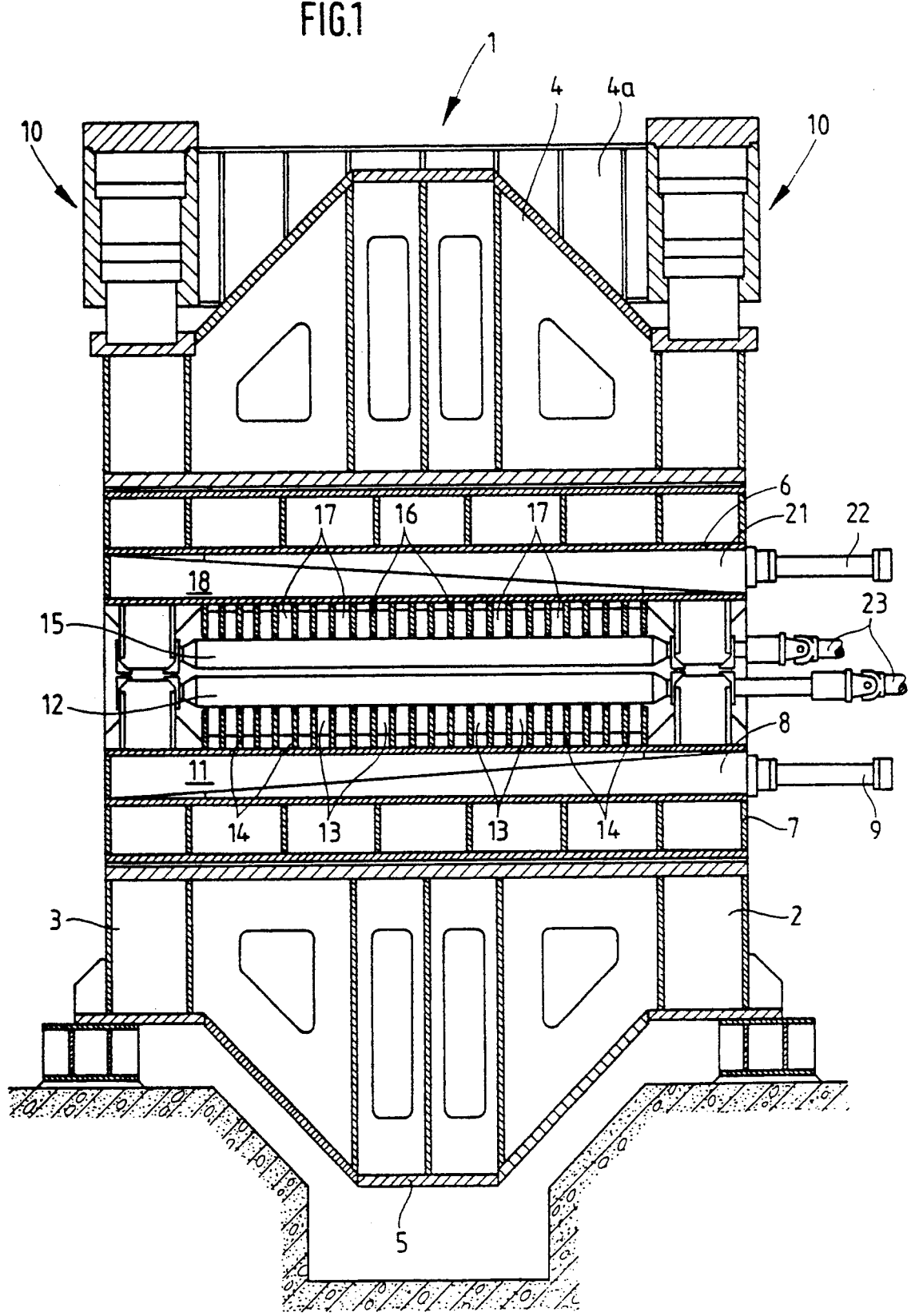
FIG. 1 is a cross-sectional view of a roller levelling machine stand.

The connection of elements of a stand frame according to the present invention will be explained on the basis of a roller levelling machine stand shown in FIG. 1. The machine stand frame of the roller levelling machine stand 1 of FIG. 1 includes two stand frame posts 2 and 3, which are anchored in a foundation and are connected by upper longitudinal and transverse frame cross-pieces 4a and 4' a lower frame cross-piece is not being designated, and upper and lower cross-beams 4, 5. Each of the upper and lower cross-beams 4, 5 is formed, in per se known manner, of a substantially rectangular element 4', 5' and a trapezoidal element 4", 5". Upper and lower roll bearers 6 and 7 are supported on the upper and lower cross-beams 4 and 5, respectively, with the lower roll bearer 7 being displaceable on its cross-beam 5. The upper cross-beam 4 is supported for displacement between the posts 2 and 3 for displacement, by adjusting cylinders 10, relative to the lower cross-beam. The adjusting cylinders 10 are supported in the transverse cross-pieces 4a' in a per se known manner. To this end, there are provided four adjusting cylinders for the upper cross-beam 4, one in each corner, on the outgoing sides.

Roll adjusting wedges 8, which are displaceable by pressure cylinders 9, are supported on the lower roll bearer 7. A back-up wedge 11 for the bottom roll 12 and its back-up roll 13, is supported on each adjusting wedge 8. Side bars 14 are provided between the back-up rolls 13. A plurality of top rolls 15 are supported, with their barrels, on back-up rolls 17, with side bars 16 being provided between the back-up rolls 17. The top levelling and back-up rolls 15 nd 17, respectively, are supported on a back-up wedge 18. Each of the adjacent back-up wedges 18 is supported by an adjusting wedge 21 the other side of which abuts the upper bearer 6. The top and bottom rolls 15, 12 are driven separately and are connected with the drive, not shown, by crankshaft 23.

Figure 2:
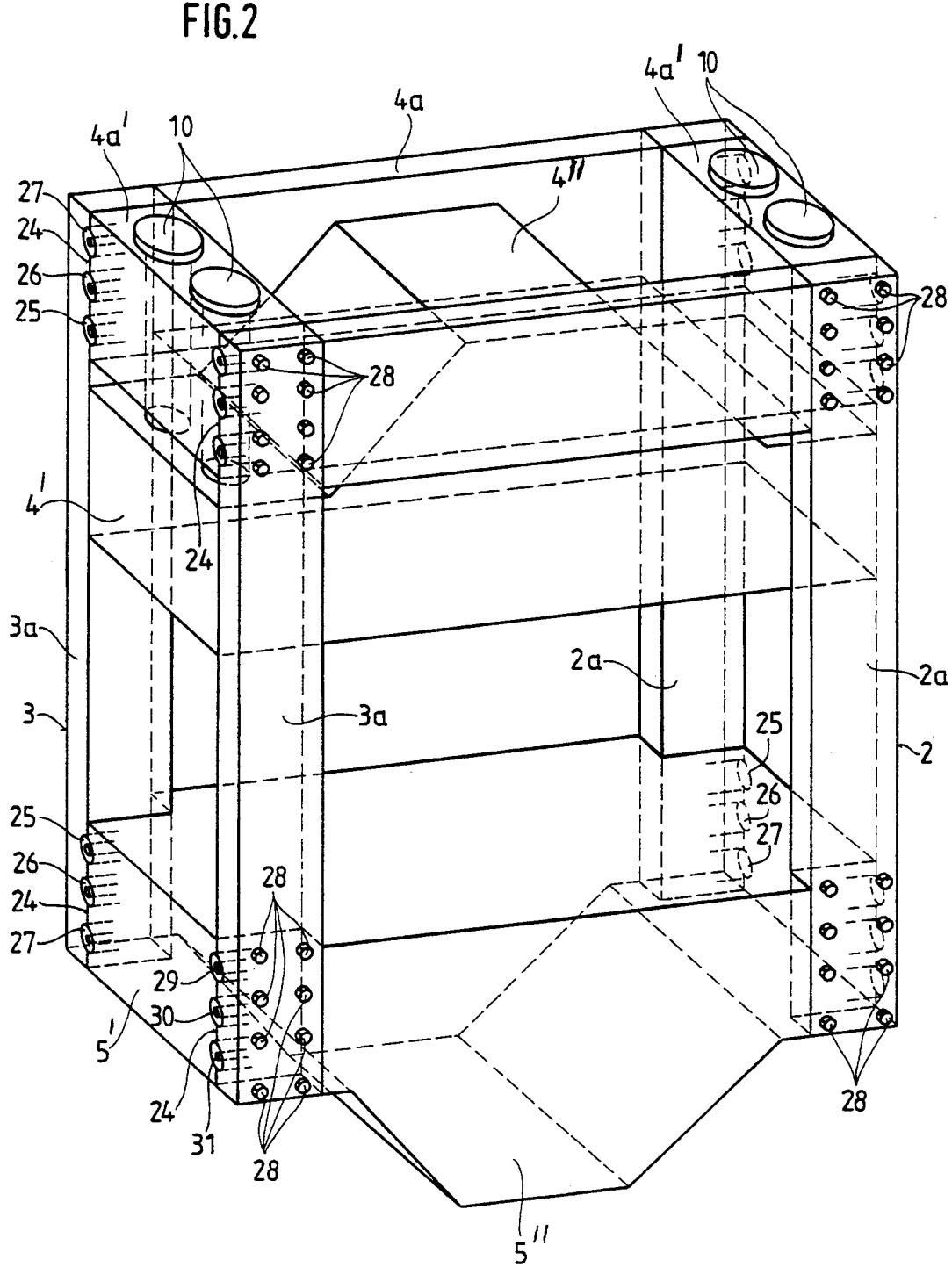
FIG. 2 is a perspective view of a machine stand frame of a roller levelling machine stand, in which the frame cross-pieces are connected to the stand frame posts with dowels in accordance with the present invention.
Figure 3:
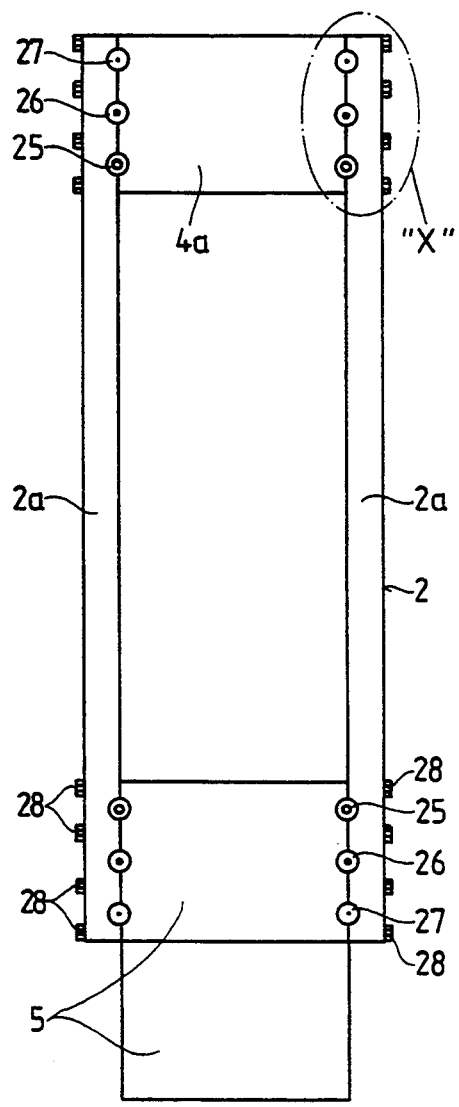
FIG. 3 is a schematic side view of the machine stand frame shown in FIG. 2.
Figure 4:
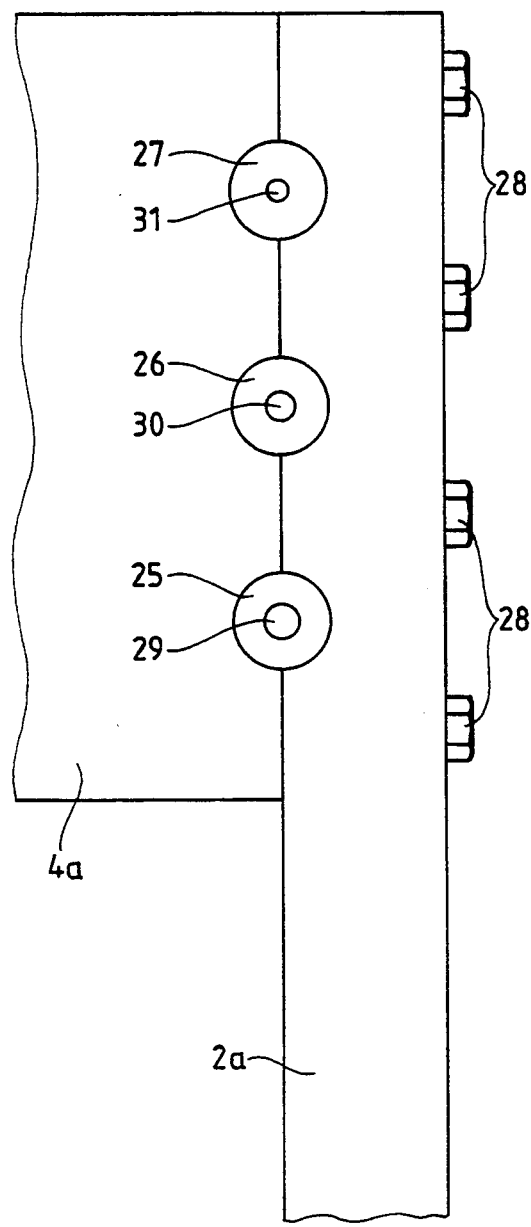
FIG. 4 is an enlarged view of a region "X" which is designated in FIG. 3 with a dot-dash line.

As shown in FIGS. 2 and 3, the post members 2a, 3a defining the stand frame posts 2 and 3 of the machine frame are connected by joints 24, formed each of three equally spaced from each other and arranged one above the other dowels 25, 26, 27, with the upper transverse cross-piece 4a' and a lower cross-beam 5, which serves as a lower frame cross-piece. The longitudinal cross-pieces 4a are connected to the posts 2, 3 by screws, as per se known. In order to take up expansion forces generated during operation, the stand frame posts 2a, 3a and the cross-elements 4a, 5 are connected with each other by screws 28, which are located on the outer sides of the housing posts 2a, 3a. As shown in more detail in FIG. 4, the dowels 25-27 have inner bores 29-31 having different diameters. At that, the dowel 25, which is provided in the region of the greatest beam force has an inner bore 29 with the biggest diameter, and the dowel 27, which is provided in the region of the smallest beams force, has an inner bore 31 with the smallest diameter. This insures uniform force distribution with a uniform carrying capacity of the dowels 25–27. Thus, upon taking up of the generated forces by the stand frame 2, 3, the different diameters of the inner bores 29–31 result in different ovalities of the cross-sections of separate dowels, 7hich influence the load distribution. Also, due to the small notch effect of the dowels 25–27, a very compact connection is obtained.

While the present invention was shown and described with reference to a particular embodiment, various modifications thereof would be apparent to those skilled in the art and, therefore, it is not intended that the invention be limited to the disclosed embodiment and/or details thereof, and departures may be made therefrom within the spirit and scope of the appended claims.

What is claimed is:

1. A frame for a stand of a roller levelling machine for producing sheets, strips and profiles, the stand including top and bottom rolls displaceable relative to each other, back-up rolls for supporting the top and bottom rolls along their longitudinal extent, and roll bearers for receiving the back-up rolls, said stand frame comprising:

spaced stand posts;

upper frame cross-piece means and lower frame cross-piece means for connecting said posts, said upper and lower frame cross-piece means supporting, respectively, the top and bottom rolls and respective back-up rolls and roll bearers; and dowel means for fixedly connecting said posts with said upper frame cross-piece means and said lower frame cross-piece means, said dowel means comprising a plurality of deformable hollow dowels.

2. A stand frame as set forth in claim 1, wherein said upper frame cross-piece means comprises upper transverse frame cross-pieces and an upper cross-beam and said lower frame cross-piece means comprises a lower cross-beam, wherein said dowel means connects said posts with said upper transverse frame cross-pieces and the lower cross-beam.

3. A stand frame as set forth in claim 2, further comprising a plurality of screws extending through side surfaces of said posts and said upper transverse cross-pieces and said lower cross-beam, respectively, for connecting said posts with said upper and lower frame cross-piece means.

4. A stand frame as set forth in claim 2, wherein said posts and said upper transverse cross-pieces and said lower cross-beam have respective dowel-receiving bore holes of the same diameter for enabling simultaneous forming of the bore holes.

5. A stand frame as set forth in claim 1, wherein said dowel means comprises a plurality of butt connection joints, and wherein each butt connection joint comprises at least two hollow dowels spaced from each other.

6. A frame for a stand of a roller levelling machine for producing sheets, strips and profiles, the stand including top and bottom rolls displaceable relative to each other, back-up rolls for supporting the top and bottom rolls along their longitudinal extent, and roll bearers for receiving the back-up rolls, said stand frame comprising:

spaced stand posts;

upper frame cross-piece means and lower frame cross-piece means for connecting said posts, said upper and lower frame cross-piece means supporting, respectively, the top and bottom rolls and respective back-up rolls and roll bearers; and dowel means for fixedly connecting said posts with said upper frame cross-piece means and said lower frame cross-piece means, wherein said dowel means comprises a plurality of connection joints, wherein each connection joint comprises at least two dowels spaced from each other and arranged one above the other, and wherein said at least two dowels have each an inner bore having a diameter which is different from a diameter of the inner bore of another dowel.

7. A stand frame as set forth in claim 6, wherein the inner bore of the dowel, which is provided in a region of a greatest beam force, has a biggest diameter, and the inner bore of the dowel, which is provided in a region of a smallest beam force, has a smallest diameter.

* * * * *